US012715046B2

(12) United States Patent
Yamaguchi

(10) Patent No.: US 12,715,046 B2
(45) Date of Patent: Aug. 25, 2026

(54) CUTTING INSERT, CUTTING TOOL, AND METHOD FOR MANUFACTURING MACHINED PRODUCT

(71) Applicant: KYOCERA CORPORATION, Kyoto (JP)

(72) Inventor: Eri Yamaguchi, Yasu (JP)

(73) Assignee: KYOCERA CORPORATION, Kyoto (JP)

(*) Notice: Subject to any disclaimer, the term of this patent is extended or adjusted under 35 U.S.C. 154(b) by 547 days.

(21) Appl. No.: 17/755,930

(22) PCT Filed: Oct. 28, 2020

(86) PCT No.: PCT/JP2020/040348
§ 371 (c)(1),
(2) Date: May 12, 2022

(87) PCT Pub. No.: WO2021/095520
PCT Pub. Date: May 20, 2021

(65) Prior Publication Data

US 2022/0379384 A1 Dec. 1, 2022

(30) Foreign Application Priority Data

Nov. 13, 2019 (JP) ................................ 2019-205156

(51) Int. Cl.
*B23B 27/16* (2006.01)

(52) U.S. Cl.
CPC ...... *B23B 27/1607* (2013.01); *B23B 2200/08* (2013.01); *B23B 2200/286* (2013.01); *B23B 2200/321* (2013.01)

(58) Field of Classification Search
CPC ........ B23B 2200/321; B23B 2200/328; B23B 2200/081; B23B 2200/286;
(Continued)

(56) References Cited

U.S. PATENT DOCUMENTS 5,044,840 A * 9/1991 Fouquer ................ B23B 27/143 407/115
8,262,324 B2 * 9/2012 Park ...................... B23B 27/141 407/113
(Continued)

FOREIGN PATENT DOCUMENTS

CN 104858460 A * 8/2015 ........... B23B 27/143
DE DD-266293 A1 * 3/1989
(Continued)

*Primary Examiner* — Ryan Rufo
(74) *Attorney, Agent, or Firm* — HAUPTMAN HAM, LLP

(57) ABSTRACT

A cutting insert in a non-limiting aspect of the present disclosure may include an upper surface, a lower surface, a lateral surface and a cutting edge. The upper surface may include a first corner and a first side. The upper surface may further include a rake surface, a bottom surface and a raised surface. The bottom surface may include a first bottom surface and a second bottom surface. The first bottom surface may be located on a bisector of the first corner. The second bottom surface may be located inwardly of the first side. The first bottom surface may be an inclined surface located closer to the lower surface as going away from the first corner. The second bottom surface may be an inclined surface located further away from the lower surface as going away from the first side.

10 Claims, 11 Drawing Sheets

(58) Field of Classification Search
CPC ...... B23B 2200/087; B23B 2200/0477; B23B 2200/0452; B23B 2200/085; B23B 2200/086; B23B 2200/323; B23C 5/205; B23C 2200/081; B23C 2200/086; B23C 2200/085
See application file for complete search history.

(56) References Cited

U.S. PATENT DOCUMENTS 10,099,294 B2 * 10/2018 Furusawa ............ B23B 27/143
2005/0019111 A1 * 1/2005 Kitagawa ............ B23B 27/141 407/113
2011/0033252 A1 2/2011 Nishida
2011/0070039 A1 * 3/2011 Park ..................... B23B 27/141 407/113
2011/0142555 A1 * 6/2011 Yamazaki ............ B23B 27/143 407/2
2012/0051855 A1 * 3/2012 Lof ...................... B23B 27/143 407/114
2012/0170987 A1 * 7/2012 Komatsuka .......... B23B 27/141 407/115
2013/0064613 A1 * 3/2013 Krishtul ............... B23B 27/143 407/115
2015/0375303 A1 * 12/2015 Fujii .................... B23B 27/143 407/66
2016/0339524 A1 * 11/2016 Yamaguchi .......... B23B 27/143
2016/0361767 A1 * 12/2016 Ikeda ................... B23B 27/145
2017/0120342 A1 * 5/2017 Fujii .................... B23B 27/143
2017/0209935 A1 7/2017 Furusawa
2019/0039152 A1 * 2/2019 Ikeda ................... B23B 27/143
2019/0168310 A1 * 6/2019 Ikeda ................... B23B 27/145
2021/0008637 A1 * 1/2021 Nagae .................. B23B 27/145

FOREIGN PATENT DOCUMENTS

JP 2009255230 A 11/2009
KR 20080008530 A * 1/2008
WO WO-2015081353 A1 * 6/2015 .......... B23B 27/143
WO 2016017470 A1 2/2016
WO WO-2017135469 A1 * 8/2017 .......... B23B 27/007

* cited by examiner

CUTTING INSERT, CUTTING TOOL, AND METHOD FOR MANUFACTURING MACHINED PRODUCT

CROSS-REFERENCE TO RELATED APPLICATIONS

This application is a national stage entry according to 35 U.S.C. 371 of PCT Application No. PCT/JP2020/040348 filed on Oct. 28, 2020, which claims priority to Japanese Patent Application No. 2019-205156, filed Nov. 13, 2019. The contents of the application are incorporated herein by reference in its entirety.

TECHNICAL FIELD

The present disclosure may generally relate to cutting inserts for use in a cutting process. Specifically, the present disclosure may relate to cutting inserts for use in a turning process.

BACKGROUND

For example, an indexable cutting insert (cutting insert) is discussed in Japanese Unexamined Patent Publication No. 2009-255230 (Patent Document 1) as a cutting insert for use in a cutting process of a workpiece, such as metal. The cutting insert discussed in Patent Document 1 may include a rake surface and a corner part located on a corner of the rake surface. The cutting insert discussed in Patent Document 1 may also include a breaker protrusion, which is raised up gradually in a bisector direction of the corner part as going away from the corner part, on the rake surface in the vicinity of the corner part. The breaker protrusion may include a front top part having an approximately convex circular arc shape in a cross section along the bisector, and a lateral part including a concave portion having an approximately concave circular arc shape in a cross section orthogonal to the bisector.

SUMMARY

A cutting insert in a non-limiting aspect of the present disclosure may include an upper surface, a lower surface, a lateral surface and a cutting edge. The upper surface may include a first corner and a first side. The first side may be extended from the first corner. The lower surface may be located on a side opposite to the upper surface. The lateral surface may be located between the upper surface and the lower surface. The cutting edge may be located on an intersection of the upper surface and the lateral surface.

The upper surface may further include a rake surface, a bottom surface and a raised surface. The rake surface may be located along the cutting edge and becomes closer to the lower surface as going away from the cutting edge. The bottom surface may be located along the rake surface further inwardly than the rake surface. The raised surface may be located along the bottom surface further inwardly than the bottom surface, and may be located further away from the lower surface as going away from the bottom surface.

The bottom surface may include a first bottom surface and a second bottom surface. The first bottom surface may be located on a bisector of the first corner. The second bottom surface may be located inwardly of the first side. The first bottom surface may be an inclined surface located closer to the lower surface as going away from the first corner. The second bottom surface may be inclined surface located further away from the lower surface as going away from the first side.

EMBODIMENTS

<Cutting Inserts>

Figure 1:
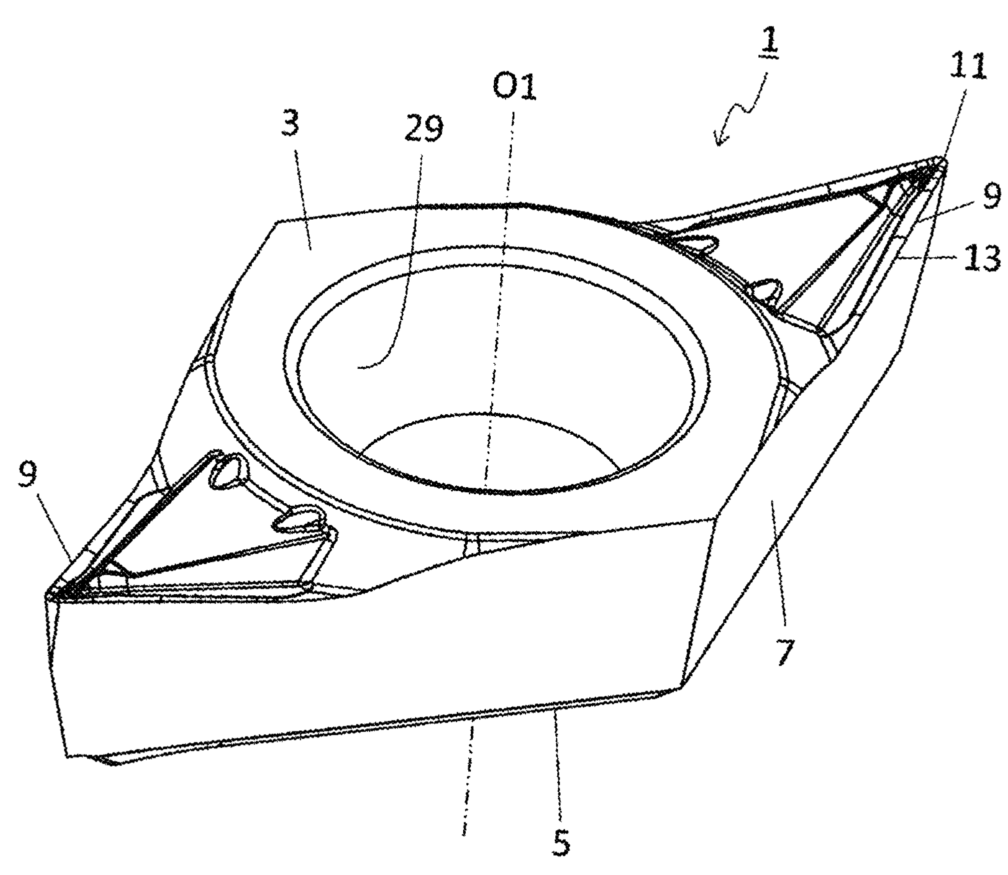
FIG. 1 is a perspective view illustrating a cutting insert in a non-limiting embodiment of the present disclosure.

The cutting inserts 1 (hereinafter also referred to as "insert 1") in non-limiting embodiment of the present disclosure may be described in detail below with reference to the drawings. For the sake of description, the drawings referred to in the following may illustrate, in simplified form, only main members necessary for describing the embodiment. The inserts 1 may therefore include any arbitrary structural member not illustrated in the drawings referred to. Dimensions of the members in each of the drawings may faithfully represent neither dimensions of actual structural members nor dimensional ratios of these members.

The insert 1 may include an upper surface 3, a lower surface 5, a lateral surface 7 and a cutting edge 9 as in a non-limiting embodiment illustrated in FIGS. 1 to 6. As used herein, the terms "the upper surface 3" and "the lower surface 5" may be used for the sake of convenience, and do not indicate upper and lower directions. For example, the upper surface 3 need not be directed upward when using the insert 1. These points may also be true for other parts including the terms of upper and lower.

The upper surface 3 may have a polygonal shape in a top view (plan view). The top view may be a state where the insert 1 is viewed toward a side of the upper surface 3. The polygonal shape may be an approximately polygonal shape and need not be a strict polygonal shape. That is, sides in the polygonal shape may visually have an approximately straight line shape and need not be a strict straight line shape as a whole. The sides may include a straight line-shaped part on at least a portion connecting to the corner. For example, the sides may have a slightly curved convex shape or concave shape. Corner of the polygonal shape may have a convex curvilinear shape, such as a circular arc shape. If the corners have the convex curvilinear shape, a radius of curvature of the corners may be kept constant or changed.

Figure 2:
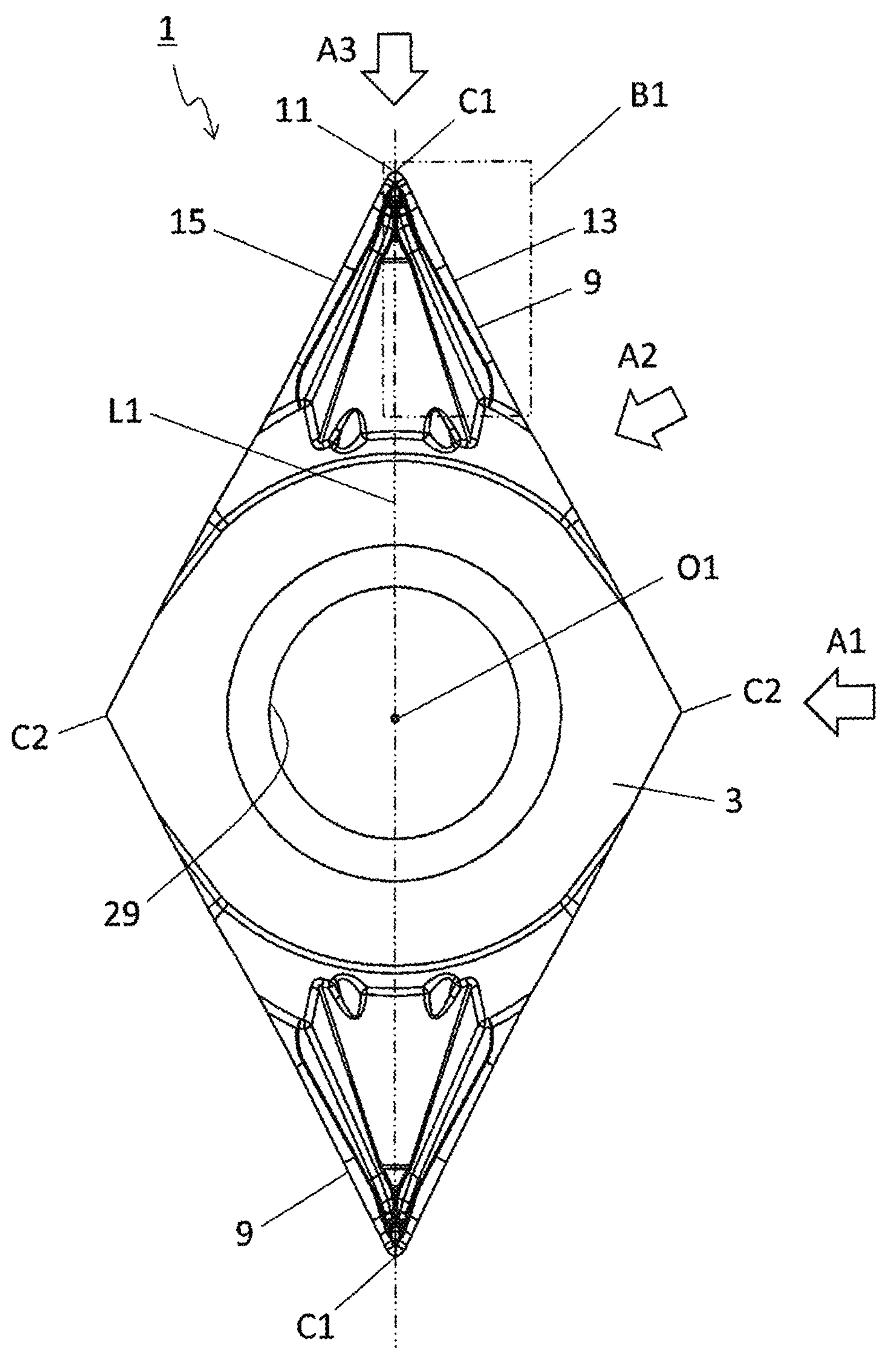
FIG. 2 is a plan view of the cutting insert illustrated in FIG. 1 as viewed from a side of an upper surface.
Figure 3:
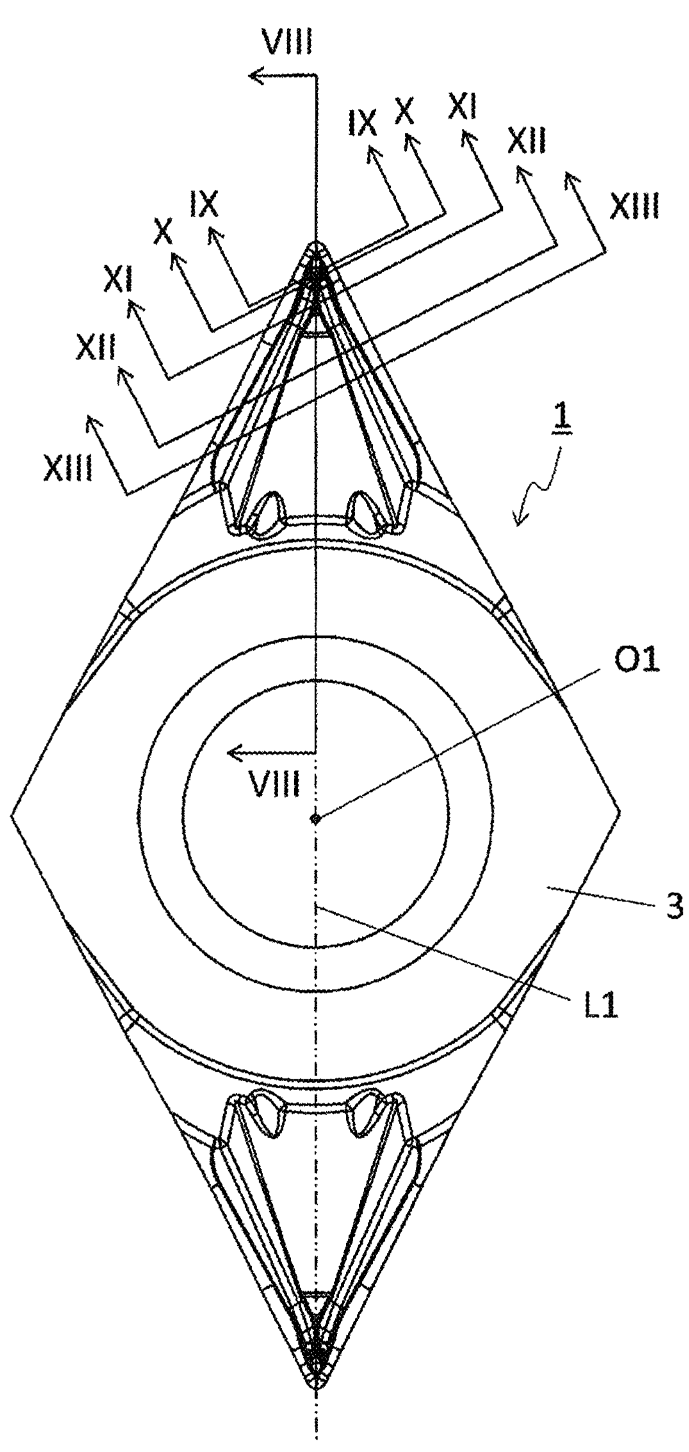
FIG. 3 is a plan view of the cutting insert illustrated in FIG. 1 as viewed from a side of the upper surface.
Figure 4:
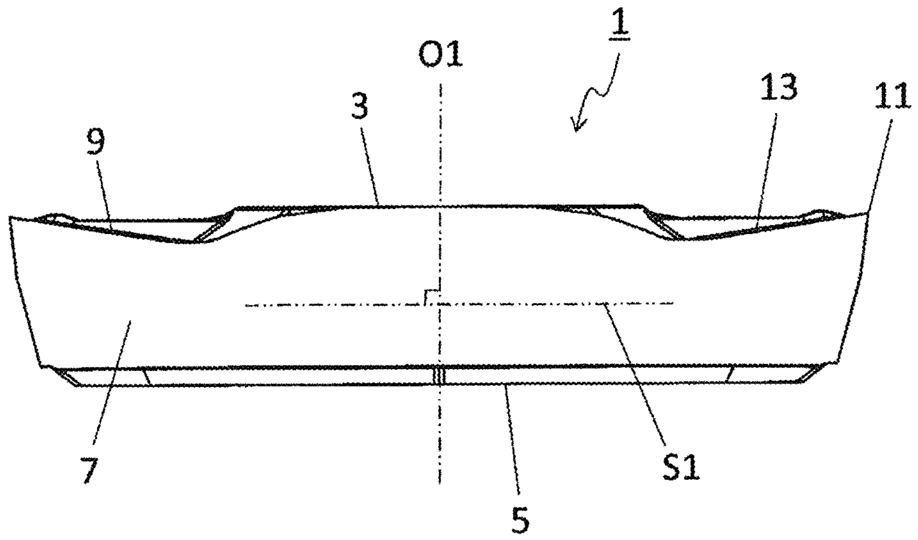
FIG. 4 is a plan view of the cutting insert illustrated in FIG. 2 as viewed from an A1 direction.
Figure 5:
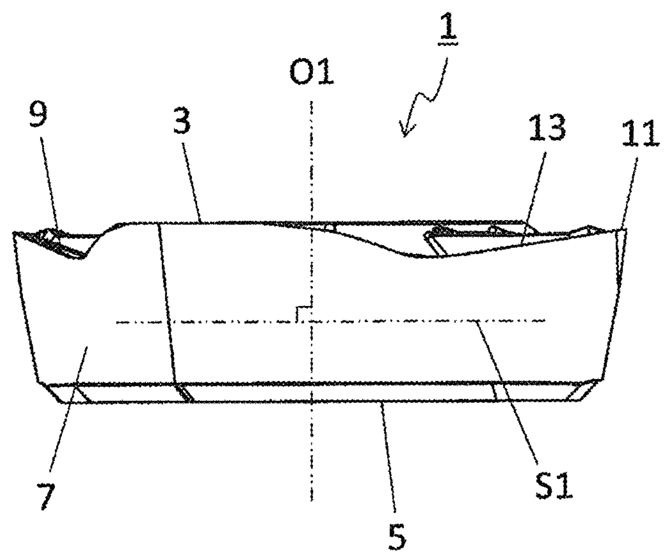
FIG. 5 is a plan view of the cutting insert illustrated in FIG. 2 as viewed from an A2 direction.
Figure 6:
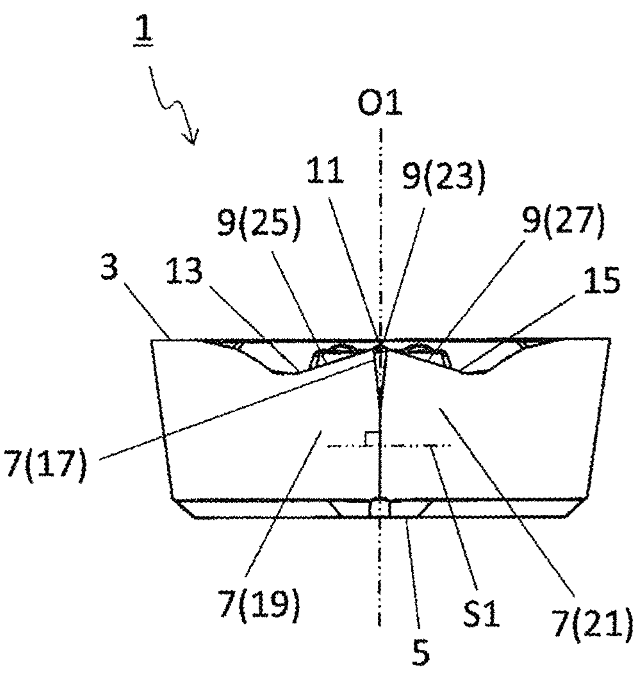
FIG. 6 is a plan view of the cutting insert illustrated in FIG. 2 as viewed from an A3 direction.

The upper surface 3 may have a quadrangular shape, more specifically a rhombus shape in a top view as in the non-limiting embodiment illustrated in FIG. 2. One of four corners of the rhombus shape may be a first corner 11. Two of the four sides of the rhombus shape which are extended from the first corner 11, in other words, one of the two sides connecting to the first corner 11 may be a first side 13, and the other may be a second side 15.

The four corners of the rhombus shape may be constituted by two acute angle corners C1 and two obtuse angle corners C2. Each of the acute angle corners C1 may be a corner where an angle at which two sides extended from the corner intersect with each other is smaller than right angles in a top view. Each of the obtuse angle corners C2 may be a corner where an angle at which two sides extended from the corner intersect with each other is larger than right angles. The first corner 11 may be the acute angle corner C1.

The shape of the upper surface 3 is not limited to the shapes illustrated above. For example, the upper surface 3 may have a polygonal shape, such as a triangular or pentagonal shape. The quadrangular shape is not limited to the rhombus shape, but may be, for example, parallelogram. These points may also be true for the lower surface 5.

The upper surface 3 may have a line symmetric shape with respect to a bisector L1 of the first corner 11. With this configuration, the same cutting performance may be attainable in both the case where the first corner 11 and the first side 13 are used for cutting out, and the case where the first corner 11 and the second side 15 are used for cutting out. The bisector L1 obtainable if the first corner 11 has the convex curvilinear shape may be replaced with a bisector whose corner is an intersection of imaginary extension lines of the first side 13 and the second side 15 in a top view.

The upper surface 3 may have a 180-degree rotationally symmetric shape with respect to a central axis O1 of the insert 1. The central axis O1 of the insert 1 may be an axis passing through a center of the upper surface 3 and a center of the lower surface 5.

Heights of the first corner 11 and the first side 13 may be kept constant or changed. For example, the height of the first corner 11 may become the largest at a center that intersects with the bisector L1, and may become smaller as going from the center toward the first side 13. Alternatively, the height of the first side 13 may become smaller as going away from the first corner 11.

Evaluation of height may be made on the basis of the lower surface 5. Alternatively, the evaluation of height may be made on the basis of an imaginary plane S1 which is orthogonal to the central axis O1 and is located between the upper surface 3 and the lower surface 5, as in a non-limiting embodiment illustrated in FIGS. 4 to 6.

The lower surface 5 may be located on a side opposite to the upper surface 3. The lower surface 5 may be servable as a seating surface leading to a pocket when attaching the insert 1 to a holder.

Similarly to the upper surface 3, the lower surface 5 may have a polygonal shape. The lower surface 5 may have the same size as or may be smaller than the upper surface 3. The lower surface 5 may have a similar shape to the upper surface 3, and may be slightly smaller than the upper surface 3. The lower surface 5 may have a rhombus shape slightly smaller than the upper surface 3 as in the non-limiting embodiment illustrated in FIG. 1.

The lateral surface 7 may be located between the upper surface 3 and the lower surface 5. At least a part of the lateral surface 7 may be servable as a flank surface. The lateral surface 7 may connect to the upper surface 3 and the lower surface 5.

A surface region of the lateral surface 7 which is located along the first corner 11 may be a first corner lateral surface 17. A surface region of the lateral surface 7 which is located along the first side 13 may be a first lateral surface 19, and a surface region of the lateral surface 7 which is located along the second side 15 may be a second lateral surface 21. The first corner lateral surface 17 may have a convex curved surface shape. The first lateral surface 19 and the second lateral surface 21 may have a planar shape.

If the lower surface 5 has a shape slightly smaller than the upper surface 3 as in the non-limiting embodiment illustrated in FIG. 1, the lateral surface 7 may be inclined so as to come closer to the central axis O1 as going from a side of the upper surface 3 to a side of the lower surface 5. In other words, the insert 1 may have a so-called positive shape. The insert 1 may have a so-called negative shape. That is, the lateral surface 7 may be parallel to the central axis O1.

The cutting edge 9 may be located on an intersection of the upper surface 3 and the lateral surface 7. The cutting edge 9 may be usable for cutting out a workpiece. The cutting edge 9 may be located on a whole or a part of the intersection of the upper surface 3 and the lateral surface 7. A part of the cutting edge 9 which is located on the first corner 11 may be a first corner cutting edge 23. A part of the cutting edge 9 which is located on the first side 13 may be a first cutting edge 25, and a part of the cutting edge 9 which is located on the second side 15 may be a second cutting edge 27.

From the viewpoint of durability of a cutting edge, a honing process, such as round honing, may be applied to the cutting edge 9. If the cutting edge 9 is subjected to the honing process, a part of the intersection of the upper surface 3 and the lateral surface 7 on which the cutting edge 9 is located may have a slightly curved surface shape instead of a strict line shape formed by the intersection of these two surfaces.

The insert 1 may include a through hole 29. The through hole 29 may open into the upper surface 3 and the lower surface 5. The through hole 29 may be extended from the center of the upper surface 3 to the center of the lower surface 5. A central axis of the through hole 29 may coincide with the central axis O1 of the insert 1 as in the non-limiting embodiment illustrated in FIG. 1.

The through hole 29 may be usable for fixing the insert 1 to a holder. For example, a screw may be inserted into the through hole 29 when the insert 1 is screwed to the holder. A method for fixing the insert 1 to the holder is not limited to the fixing with the screw. For example, the through hole 29 may be used for fixing the insert 1 to the holder by a clamping member. In this case, the through hole 29 may not be extended to the lower surface 5.

The insert 1 is not limited to a specific size. For example, a maximum width of the upper surface 3 may be set to approximately 6-25 mm. A height from the upper surface 3 to the lower surface 5 may be set to approximately 1-10 mm. A height from the upper surface 3 to the lower surface 5 may be a length in a direction parallel to the central axis O1 in between an upper end of the upper surface 3 and a lower end of the lower surface 5.

The upper surface 3 may include a rake surface 31, a bottom surface 33 and a raised surface 35 as in a non-limiting embodiment illustrated in FIGS. 7 to 13. The rake surface 31 may be located along the cutting edge 9. The rake surface 31 may come closer to the lower surface 5 as going away from the cutting edge 9. The bottom surface 33 may be located along the rake surface 31 further inwardly than the rake surface 31. The raised surface 35 may be located along the bottom surface 33 further inwardly than the bottom surface 33. The raised surface 35 may be located further away from the lower surface 5 as going away from the bottom surface 33. The term "inwardly" may denote a direction to come closer to the central axis O1.

The rake surface 31 may be usable for curling chips generated by the cutting edge 9. The raised surface 35 may be usable for controlling a flow direction of the chips generated by the cutting edge 9. If the upper surface 3 includes the bottom surface 33, the chips generated by the cutting edge 9 may be likely to come into contact with three locations of the rake surface 31, the bottom surface 33 and the raised surface 35. The shape of the chips may tend to become stable because the chips are supported at these three locations.

The rake surface 31 and the bottom surface 33 may connect to each other, or alternatively another surface may be located therebetween. This may also be true for the bottom surface 33 and the raised surface 35. As in a non-limiting embodiment illustrated in FIG. 7, the upper surface 3 may include a first connection surface 37 having a concave curved surface shape which is located between the rake surface 31 and the bottom surface 33, and connects to the rake surface 31 and the bottom surface 33. The upper surface 3 may also include a second connection surface 39 having a concave curved surface shape which is located between the bottom surface 33 and the raised surface 35, and connects to the bottom surface 33 and the raised surface 35. The first connection surface 37 may be servable as a surface that smoothly connect the rake surface 31 and the bottom surface 33. Similarly, the second connection surface 39 may be servable as a surface that smoothly connects the bottom surface 33 and the raised surface 35.

A determination of whether or not the upper surface 3 includes the rake surface 31, the bottom surface 33 and the raised surface 35 may be made by a cross section that is orthogonal to the cutting edge 9 in a top view and orthogonal to the lower surface 5. Specifically, if target surfaces are observed in the above cross section, the surfaces individually recognizable as a straight line shape may be determined as the rake surface 31, the bottom surface 33 and the raised surface 35. The rake surface 31, the bottom surface 33 and the raised surface 35 may individually include a flat portion indicated by a straight line in the above cross section.

Figure 8:
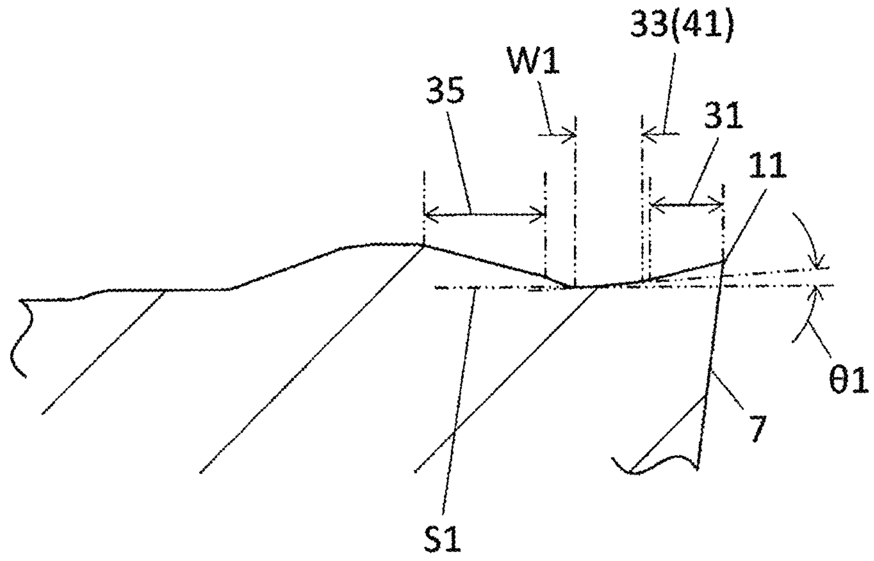
FIG. 8 is an enlarged view taken along the line VIII-VIII in the cutting insert illustrated in FIG. 3.
Figure 9:
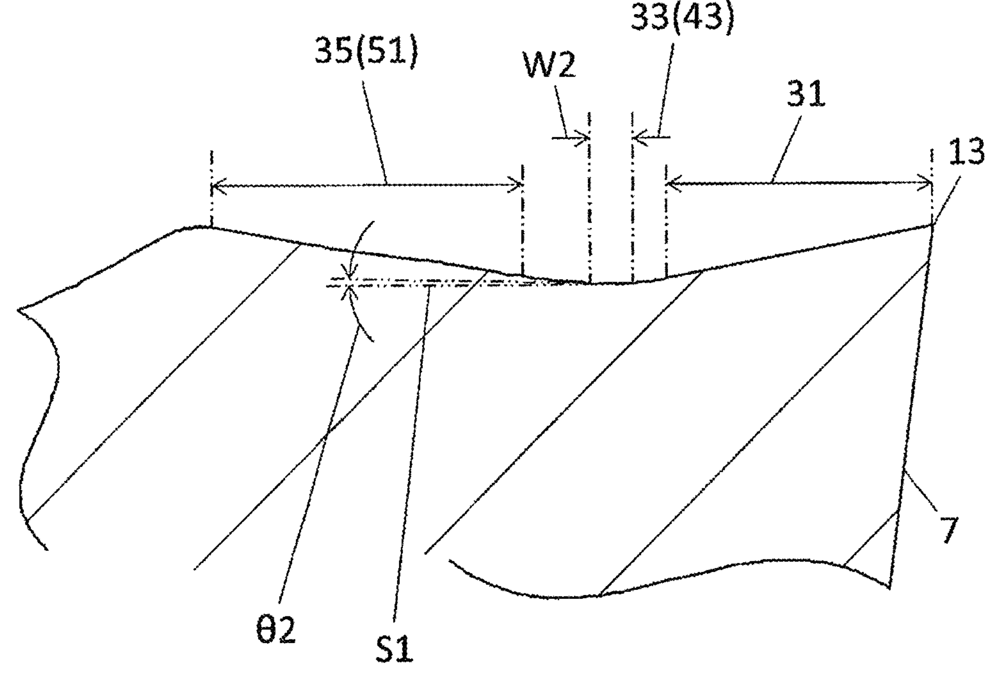
FIG. 9 is an enlarged view taken along the line IX-IX in the cutting insert illustrated in FIG. 3.

As in a non-limiting embodiment illustrated in FIGS. 8 and 9, the bottom surface 33 may include a first bottom surface 41 and a second bottom surface 43. The first bottom surface 41 may be located on a bisector L1 of the first corner 11. The second bottom surface 43 may be located inwardly of the first side 13. The first bottom surface 41 may be an inclined surface located closer to the lower surface 5 as going away from the first corner 11. The second bottom surface 43 may be an inclined surface located further away from the lower surface 5 as going away from the first side 13.

For example, in a cutting process with a small depth of cut as in cases where only the first corner cutting edge 23 is used as a cutting edge, chips may have a small width and behavior of the chips may tend to become unstable. However, in cases where the first bottom surface 41 is the inclined surface that is downwardly inclined as described above, the first bottom surface 41 may tend to serve as the rake surface instead of the raised surface. Because a large region servable as the rake surface is ensured, the behavior of the chips may tend to become stable and chip clogging may be less likely to occur.

In a cutting process with a large depth of cut as in cases where the first corner cutting edge 23 and the first cutting edge 25 are used as a cutting edge, a stable curling may be required because the chips have a large width. In cases where the second bottom surface 43 is the inclined surface that is upwardly inclined as described above, the second bottom surface 43 may tend to serve as the raised surface instead of the rake surface. Because a large region servable as the raised surface is ensured, the chips may tend to curled stably, and chip clogging may be less likely to occur. This embodiment may lead to enhanced chip discharge performance.

The first bottom surface 41 and the second bottom surface 43 may connect to each other, or alternatively another surface may be located therebetween.

An inclination angle θ1 of the first bottom surface 41 relative to the lower surface 5 may be equal to or different from an inclination angle θ2 of the second bottom surface 43 relative to the lower surface 5. If the inclination angle θ1 is larger than the inclination angle θ2 as in the non-limiting embodiment illustrated in FIGS. 8 and 9, the behavior of chips may tend to become stable on the first bottom surface 41.

The inclination angle θ1 of the first bottom surface 41 may be evaluated in a cross section along the bisector L1 in a top view and orthogonal to the lower surface 5 as in the non-limiting embodiment illustrated in FIG. 8. The inclination angle θ2 of the second bottom surface 43 may be evaluated in a cross section orthogonal to the first side 13 in a top view and orthogonal to the lower surface 5 as in the non-limiting embodiment illustrated in FIG. 9. The evaluations of the inclination angle θ1 and the inclination angle θ2 may be made on the basis of an imaginary plane parallel to the lower surface 5, or the imaginary plane S1 described above. This may also be true for other inclination angle.

The inclination angle θ1 and the inclination angle θ2 are not limited to a specific value. For example, the inclination angle θ1 may be set to 3-10°, and the inclination angle θ2 may be set to 1-8°.

The first bottom surface 41 may be inclined relative to the rake surface 31 in a cross section along the bisector L1 in a top view and orthogonal to the lower surface 5. In other words, the inclination angle θ1 of the first bottom surface 41 may be different from an inclination angle of the rake surface 31 relative to the lower surface 5 in the above cross section. As in the non-limiting embodiment illustrated in FIG. 8, if the inclination angle θ1 is smaller than the inclination angle of the rake surface 31 relative to the lower surface 5, the behavior of chips may tend to become stable.

The second bottom surface 43 may be inclined relative to the raised surface 35 in a cross section orthogonal to the first side 13 in a top view and orthogonal to the lower surface 5. In other words, the inclination angle θ2 of the second bottom surface 43 may be different from an inclination angle of the raised surface 35 relative to the lower surface 5 in the above cross section. As in the non-limiting embodiment illustrated in FIG. 9, if the inclination angle θ2 is smaller than the inclination angle of the raised surface 35 relative to the lower surface 5, the behavior of chips may tend to become stable.

The second bottom surface 43 may include a part whose width W2 in a direction orthogonal to the first side 13 becomes larger as going away from the first bottom surface 41 in a top view. In this embodiment, chips being curled on the raised surface 35 may tend to go forward in a direction away from the first corner 11. Consequently, chip clogging may be much less likely to occur. The width W2 is not limited to a specific value. For example, the width W2 may be set to approximately 0.05-0.3 mm.

A width W1 of the first bottom surface 41 on the bisector L1 of the first corner 11 may be equal to or different from a maximum value of the width W2. As in the non-limiting embodiment illustrated in FIGS. 8 and 9, if the width W1 is larger than the maximum value of the width W2, chips that are generated by the first corner cutting edge 23 and are susceptible to unstable behavior may be far less prone to clogging. The width W1 is not limited to a specific value. For example, the width W1 may be set to approximately 0.1-0.5 mm.

Figure 10:
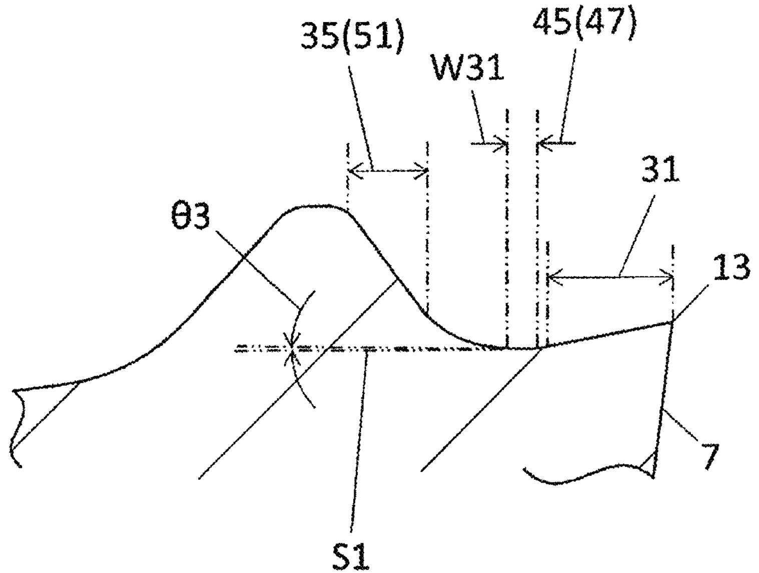
FIG. 10 is an enlarged view taken along the line X-X in the cutting insert illustrated in FIG. 3.

The bottom surface 33 may further include a third bottom surface 45 as in a non-limiting embodiment illustrated in FIG. 10. The third bottom surface 45 may be located inwardly of the first side 13 and may be located further away from the first bottom surface 41 than the second bottom surface 43. The third bottom surface 45 may be an inclined surface located further away from the lower surface 5 as going away from the first side 13. An inclination angle θ3 of the third bottom surface 45 relative to the lower surface 5 may be smaller than the inclination angle θ2 of the second bottom surface 43 relative to the lower surface 5 in a cross section orthogonal to the first side 13 in a top view and orthogonal to the lower surface 5. In these cases, chips that go forward on the second bottom surface 43 and the third bottom surface 45 and are curled on the raised surface 35 may further tend to go forward in a direction away from the first corner 11. Hence, chip clogging may be much less likely to occur.

The second bottom surface 43 and the third bottom surface 45 may connect to each other, or alternatively another surface may be located therebetween. The inclination angle θ3 of the third bottom surface 45 is not limited to a specific value. For example, the inclination angle θ3 may be set to 0.5-5°.

The third bottom surface 45 may be inclined relative to the raised surface 35 in a cross section orthogonal to the first side 13 in a top view and orthogonal to the lower surface 5. In other words, the inclination angle θ3 of the third bottom surface 45 may be different from an inclination angle of the raised surface 35 relative to the lower surface 5 in the above cross section. As in the non-limiting embodiment illustrated in FIG. 10, if the inclination angle θ3 is smaller than the inclination angle of the raised surface 35 relative to the lower surface 5, the behavior of chips may tend to become stable.

Figure 11:
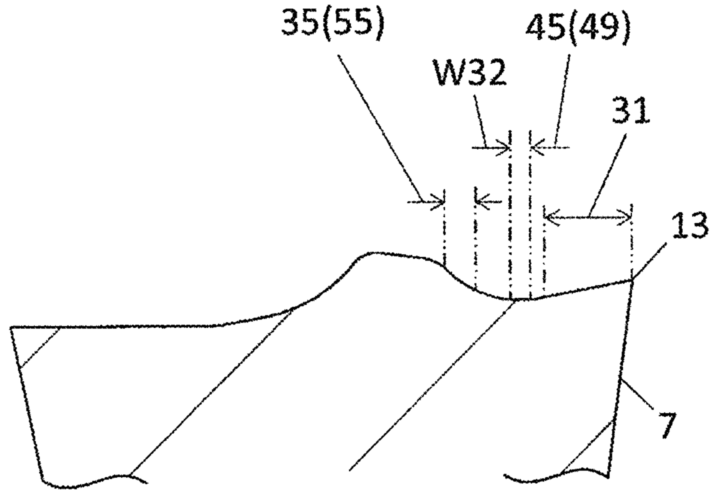
FIG. 11 is an enlarged view taken along the line XI-XI in the cutting insert illustrated in FIG. 3.

The third bottom surface 45 may include a first region 47 and a second region 49 as in a non-limiting embodiment illustrated in FIGS. 10 and 11. A width W31 of the first region 47 in a direction orthogonal to the first side 13 may become larger as going away from the first bottom surface 41 in a top view. The second region 49 may be located further away from the second bottom surface 43 than the first region 47 in a top view, and a width W32 in a direction orthogonal to the first side 13 may become smaller as going away from the first bottom surface 41. If the third bottom surface 45 includes the first region 47 and the second region 49, chips may tend to be bent at a part thereof passing near a boundary between these regions. The behavior of the chips may tend to become stable, and chip clogging may be less likely to occur.

The phrase that the width W31 becomes larger is a concept including the fact that there may be a part where the width W31 remains unchanged, without being limited to a configuration that the width W31 becomes larger over the entire length of the first region 47. Therefore, the first region 47 may include a part where the width W31 is constant, or may include a part where the width W31 does not become larger at a certain ratio. Alternatively, the width W31 may become larger stepwise. These points may also be true for definition of a width W32 in the second region 49.

The width W31 and the width W32 are not limited to a specific value. For example, the width W31 may be set to approximately 0.05-0.5 mm. The width W32 may be set to approximately 0.05-0.5 mm.

The first region 47 and the second region 49 may connect to each other, or alternatively another region may be located therebetween.

Figure 7:
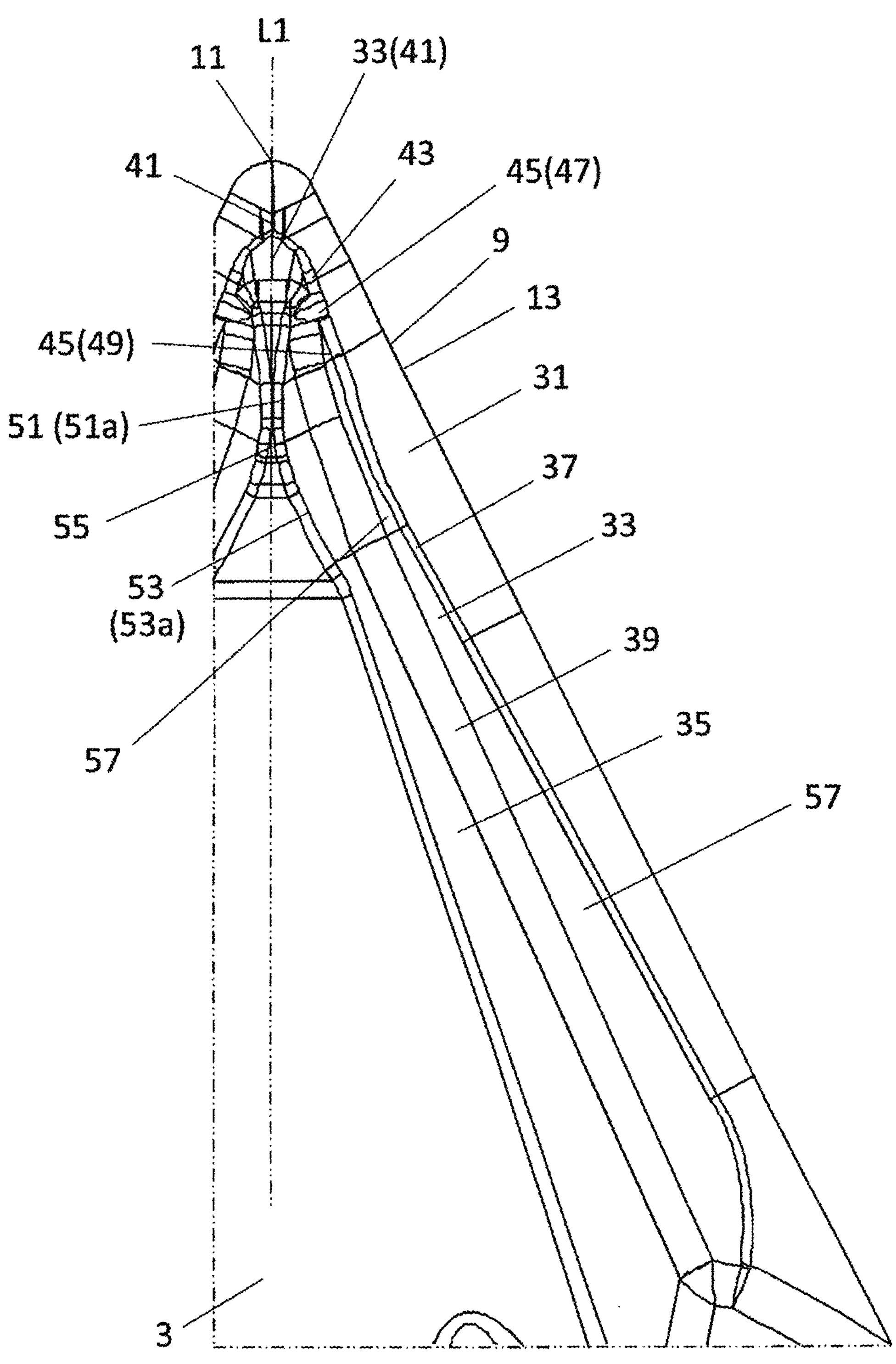
FIG. 7 is an enlarged view of a region B1 illustrated in FIG. 2.

The raised surface 35 may include a first raised surface 51 and a second raised surface 53 as in the non-limiting embodiment illustrated in FIG. 7. The first raised surface 51 may be located inwardly of the first side 13, and a height of an upper end 51*a* may increase as going away from the first corner 11. The second raised surface 53 may be located inwardly of the first side 13 and may be located further away from the first corner 11 than the first raised surface 51. A height of an upper end 53*a* of the second raised surface 53 may decrease as going away from the first corner 11. The first region 47 may be located closer to the first corner 11 than a boundary 55 between the first raised surface 51 and the second raised surface 53 as in a non-limiting embodiment illustrated in FIGS. 10 and 11.

The first raised surface 51 and the second raised surface 53 may connect to each other.

Figure 12:
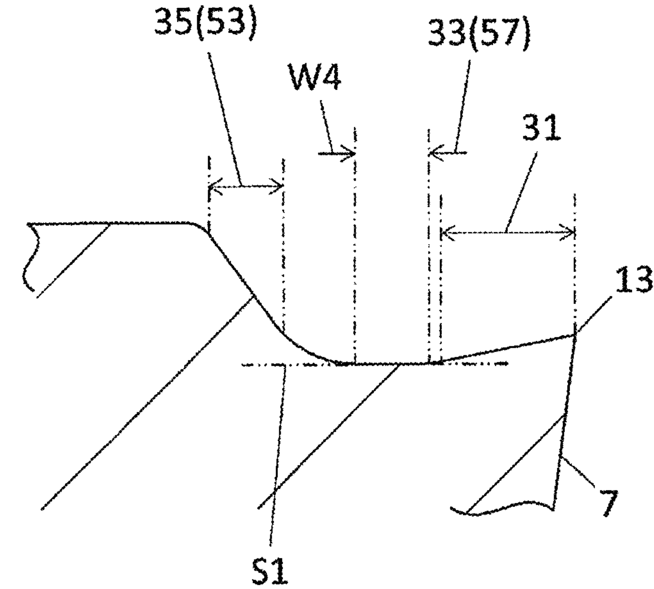
FIG. 12 is an enlarged view taken along the line XII-XII in the cutting insert illustrated in FIG. 3.
Figure 13:
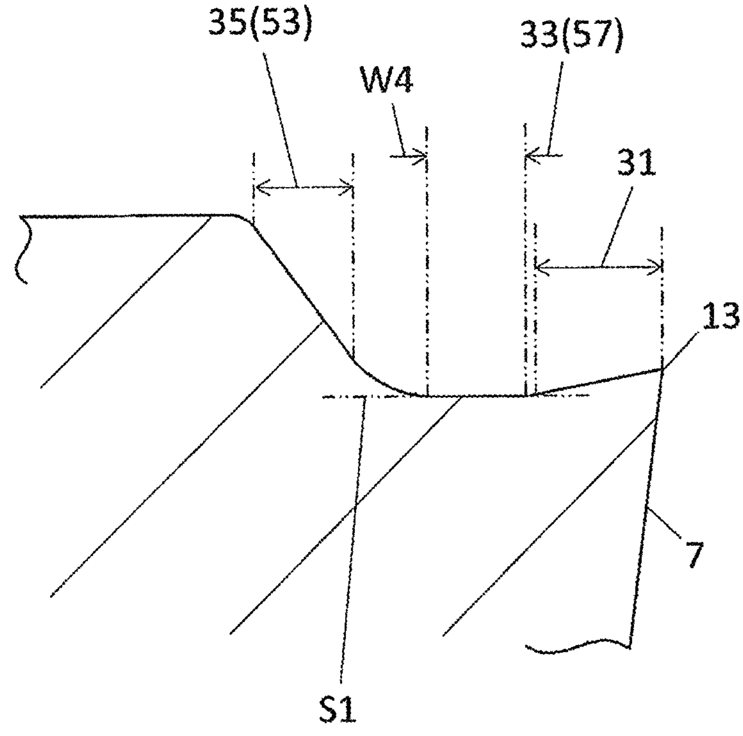
FIG. 13 is an enlarged view taken along the line XIII-XIII in the cutting insert illustrated in FIG. 3.

The bottom surface 33 may further include a fourth bottom surface 57 as in a non-limiting embodiment illustrated in FIGS. 12 and 13. The fourth bottom surface 57 may be located inwardly of the first side 13 and may be located further away from the first bottom surface 41 than the third bottom surface 45. The fourth bottom surface 57 may be a surface parallel to the lower surface 5.

The term "being parallel to" does not denote being strictly parallel to, but may denote including a deviation of approximately ±3°. The fourth bottom surface 57 may have the largest area on the bottom surface 33.

The fourth bottom surface 57 may include a part whose width W4 in a direction orthogonal to the first side 13 becomes narrower as going away from the third bottom surface 45.

The third bottom surface 45 and the fourth bottom surface 57 may connect to each other, or alternatively another surface may be located therebetween. The width W4 is not limited to a specific value. For example, the width W4 may be set to approximately 0.2-0.8 mm.

For example, inorganic materials, such as cemented carbide, cermet and ceramics, may be usable as a material of the insert 1. Examples of composition of the cemented carbide may include WC (tungsten carbide)-Co, WC—TiC (titanium carbide)-Co and WC—TiC—TaC (tantalum carbide)-Co, in which WC, TiC and TaC may be hard particles and Co may be a binding phase.

The cermet may be a sintered composite material obtainable by compositing metal into a ceramic component. Examples of the cermet may include compounds composed mainly of TiC or TiN(titanium nitride). Of course, it should be clear that the material of the insert 1 is not limited to these materials.

Alternatively, though not particularly illustrated, the insert 1 may be configured to include a base (base body) including the above material, and a coating layer to cover the base. Examples of material of the coating layer may include carbides, nitrides, oxides, oxocarbons, nitrogen oxides, carbonitrides and carboxynitrides of titanium.

The coating layer may include one or more of the above materials. The coating layer may be formed by one layer or more layers laminated one upon another. The material of the coating layer is not limited to the above materials.

The coating layer may be located on the base by using chemical vapor deposition (CVD) method or physical vapor deposition (PVD) method.

<Cutting Tools>

Cutting tools 101 in non-limiting embodiments of the present disclosure may be described below with reference to the drawings.

Figure 14:
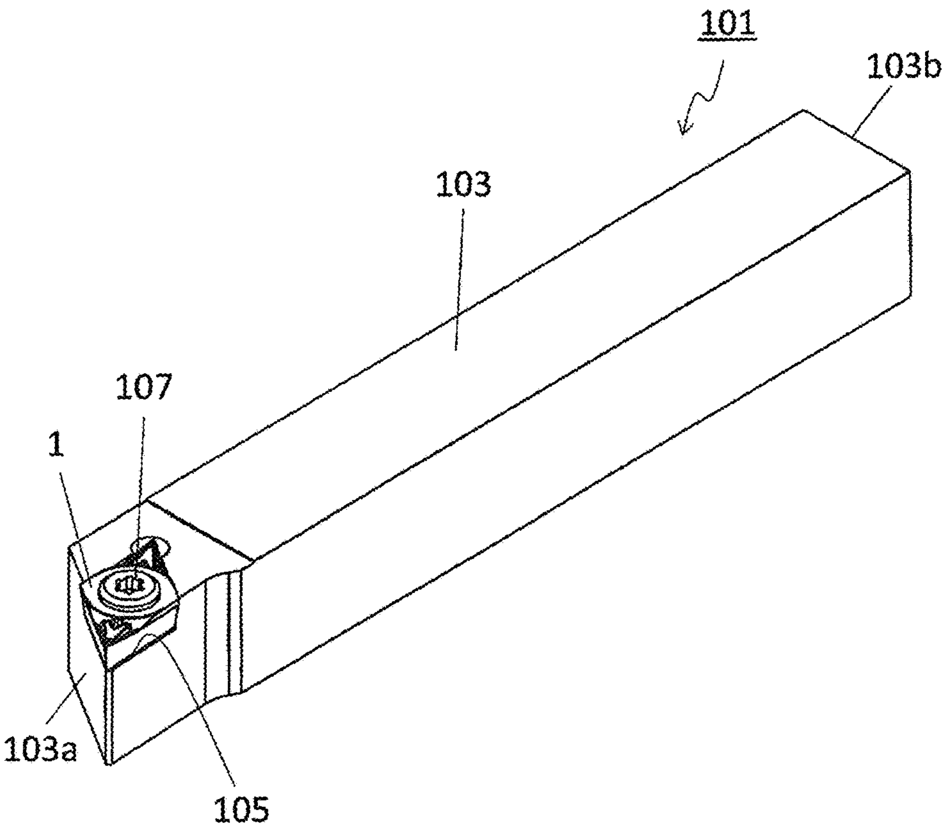
FIG. 14 is a perspective view illustrating a cutting tool in a non-limiting embodiment of the present disclosure.

The cutting tool 101 may include a holder 103 and an insert 1 as in a non-limiting embodiment illustrated in FIG. 14. If the cutting tool 101 includes the insert 1, excellent cutting performance may be attainable because of high chip discharge performance of the insert 1.

The holder 103 may have a bar shape extended from a first end 103*a* toward a second end 103*b*. The holder 103 may include a pocket 105 located at the first end 103*a*. The pocket 105 may be a part that permits attachment of the insert 1. The pocket 105 may open into the first end 103*a* (a front end surface) and a lateral surface of the holder 103. The pocket 105 may include a seating surface parallel to a lower surface of the holder 103, and a constraining lateral surface inclined relative to the seating surface. These embodiments may facilitate the attachment of the insert 1.

The insert 1 may be located in the pocket 105. The lower surface 5 of the insert 1 may be in direct contact with the pocket 105. Alternatively, a sheet may be held between the insert 1 and the pocket 105.

The insert 1 may be attached to the holder 103 so that the cutting edge 9 is protruded from the front end of the holder 103. The insert 1 may be attached to the holder 103 with a screw 107 as in a non-limiting embodiment illustrated in FIG. 14. Specifically, the insert 1 may be attached to the holder 103 by inserting the screw 107 into the through hole 29 of the insert 1, and by inserting a front end of the screw 107 into a screw hole formed in the pocket 105 so as to establish thread engagement between screw parts.

For example, steel and cast iron may be usable as a material of the holder 103. If the material of the holder 103 is steel, the holder 103 may have high toughness.

The non-limiting embodiment illustrated in FIG. 14 may illustrate the cutting tool 101 used for a so-called turning process. Examples of the turning process may include internal diameter machining, external diameter machining and grooving process. The cutting tool 101 (insert 1) is not limited to ones which are used for the turning process. There may be no problem even if the insert 1 is used for the cutting tool 101 for use in a milling process.

<Methods for Manufacturing Machined Product>

Methods for manufacturing a machined product 201 in non-limiting embodiments of the present disclosure may be described below with reference to the drawings.

The machined product 201 may be manufacturable by carrying out a cutting process of a workpiece 203. The methods for manufacturing the machined product 201 in the non-limiting embodiments may include the following steps:

(1) rotating the workpiece 203;

(2) bringing the cutting tool 101 represented by the above non-limiting embodiments into contact with the workpiece 203 being rotated; and (3) moving the cutting tool 101 away from the workpiece 203.

Figure 15:
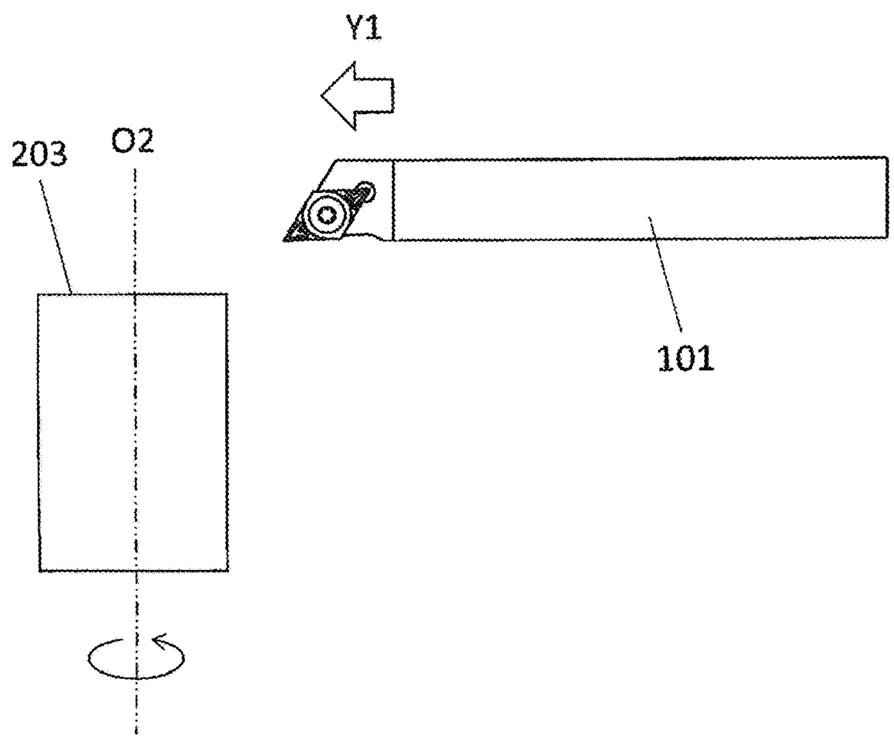
FIG. 15 is a schematic diagram illustrating one of steps in a method for manufacturing a machined product in a non-limiting embodiment of the present disclosure.
Figure 16:
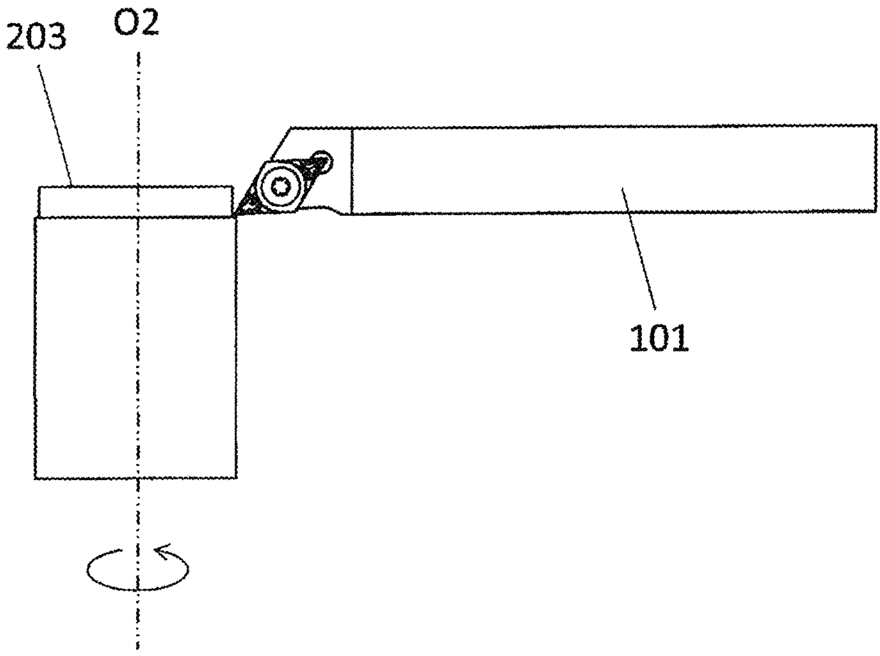
FIG. 16 is a schematic diagram illustrating one of the steps in the method for manufacturing a machined product in the non-limiting embodiment of the present disclosure.
Figure 17:
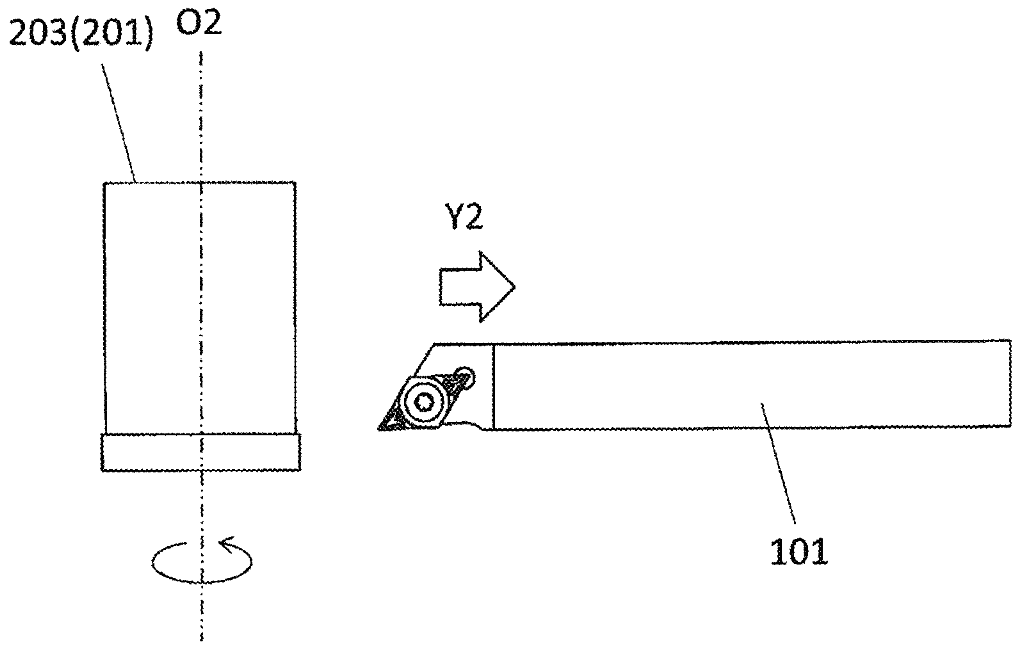
FIG. 17 is a schematic diagram illustrating one of the steps in the method for manufacturing a machined product in the non-limiting embodiment of the present disclosure.

More specifically, firstly, the workpiece 203 may be rotated around an axis O2 as in a non-limiting embodiment illustrated in FIG. 15, and the cutting tool 101 may be relatively brought near the workpiece 203. Subsequently, the workpiece 203 may be cut out by bringing the cutting edge 9 of the insert 1 in the cutting tool 101 into contact with the workpiece 203 as in a non-limiting embodiment illustrated in FIG. 16. Thereafter, the cutting tool 101 may be relatively moved away from the workpiece 203 as in a non-limiting embodiment illustrated in FIG. 17.

As in the non-limiting embodiment illustrated in FIG. 15, the cutting tool 101 may be brought near the workpiece 203 by moving the cutting tool 101 in a Y1 direction in a state where the axis O2 is fixed and the workpiece 203 is rotated around the axis O2. As in the non-limiting embodiment illustrated in FIG. 16, the workpiece 203 may be cut out by bringing the cutting edge 9 of the insert 1 into contact with the workpiece 203 being rotated. As in the non-limiting embodiment illustrated in FIG. 17, the cutting tool 101 may be moved away by moving the cutting tool 101 in a Y2 direction in a state where the workpiece 203 is rotated.

In the method for manufacturing the machined product 201 in the non-limiting embodiment of the present disclosure, if using the cutting tool 101 including the insert 1, the chip discharge performance of the insert 1 may be high. It may therefore be possible to obtain the machined product 201 whose finished surface has high accuracy.

In the cutting process with the manufacturing method in the non-limiting embodiments, the cutting tool 101 may be brought into contact with the workpiece 203, or the cutting tool 101 may be moved away from the workpiece 203 by moving the cutting tool 101 in the individual steps. However, it is not intended to limit to this embodiment.

For example, the workpiece 203 may be brought near the cutting tool 101 in the step (1). Similarly, the workpiece 203 may be moved away from the cutting tool 101 in the step (3). If it is desired to continue the cutting process, the step of bringing the cutting edge 9 of the insert 1 into contact with different portions of the workpiece 203 may be repeated while keeping the workpiece 203 rotated.

Representative examples of material of the workpiece 203 may include carbon steel, alloy steel, stainless steel, cast iron and nonferrous metals.

The invention claimed is:

1. A cutting insert, comprising:

an upper surface comprising a first corner and a first side extended from the first corner;

a lower surface located on a side opposite to the upper surface;

a lateral surface located between the upper surface and the lower surface; and a cutting edge located on an intersection of the upper surface and the lateral surface, the upper surface further comprising a rake surface located along the cutting edge and becoming closer to the lower surface as the rake surface going away from the cutting edge, a bottom surface located along the rake surface further inwardly than the rake surface, and a raised surface located along the bottom surface further inwardly than the bottom surface, the raised surface being a continuously inclined surface that becomes further away from the lower surface as the raised surface going away from the bottom surface, the bottom surface comprising a first bottom surface located on a bisector of the first corner in a plan view of the upper surface, a second bottom surface located inwardly of the first side, and a third bottom surface located inwardly of the first side and located further away from the first bottom surface than the second bottom surface, wherein the first bottom surface becomes closer to the lower surface as the first bottom surface going away from the first corner, an inclination angle of the first bottom surface relative to the lower surface is smaller than an inclination angle of the rake surface relative to the lower surface, the second bottom surface is a continuously inclined surface that becomes further away from the lower surface as the second bottom surface going away from the first side, the raised surface is located along the first bottom surface and the second bottom surface, an inclination angle of the second bottom surface relative to the lower surface is smaller than an inclination angle of the raised surface relative to the lower surface, the third bottom surface becomes further away from the lower surface as the third bottom surface going away from the first side, an inclination angle of the third bottom surface relative to the lower surface is smaller than the inclination angle of the second bottom surface relative to the lower surface in a cross section orthogonal to the first side in the plan view of the upper surface and orthogonal to the lower surface, the third bottom surface comprises, in the plan view of the upper surface, a first region whose width in a direction orthogonal to the first side becomes larger as the first region of the third bottom surface going away from the first bottom surface, and a second region located, further away from the second bottom surface than the first region, and a width of the second region in the direction orthogonal to the first side becomes smaller as the second region of the third bottom surface going away from the first bottom surface, the raised surface comprises a first raised surface which is located inwardly of the first side, a height of the first raised surface increasing as the first raised surface going away from the first corner, and a second raised surface which is located inwardly of the first side and located further away from the first corner than the first raised surface, a height of the second raised surface decreasing as the second raised surface going away from the first corner, and the first region is located closer to the first corner than a boundary between the first raised surface and the second raised surface.

2. The cutting insert according to claim 1, wherein the second bottom surface comprises a part whose width in a direction orthogonal to the first side becomes larger as the part of the second bottom surface going away from the first bottom surface in the plan view of the upper surface.

3. The cutting insert according to claim 1, wherein the bottom surface further comprises a fourth bottom surface located inwardly of the first side and located further away from the first bottom surface than the third bottom surface, and the fourth bottom surface is parallel to the lower surface.

4. A cutting tool, comprising:

a holder having a bar shape extended from a first end toward a second end and comprising a pocket located at the first end; and the cutting insert according to claim 1, the cutting insert being located in the pocket.

5. A method for manufacturing a machined product by the cutting tool according to claim 4, the method comprising:

rotating a workpiece;

bringing the cutting tool into contact with the workpiece being rotated; and moving the cutting tool away from the workpiece.

6. The cutting insert according to claim 1, wherein the bottom surface, which includes the first and second bottom surfaces, has a straight line shape in a cross section that is orthogonal to the cutting edge in the plan view of the upper surface, and orthogonal to the lower surface.

7. The cutting insert according to claim 1, wherein the raised surface is elongated, in a direction away from the first corner, along an entirety of the first bottom surface and an entirety of the second bottom surface.

8. The cutting insert according to claim 1, wherein the first bottom surface and the second bottom surface are directly connected to each other.

9. The cutting insert according to claim 1, wherein the upper surface further comprises a first surface being a continuously inclined surface that becomes continuously further away from the lower surface as the first surface extending from the first bottom surface to the raised surface to directly connect the first bottom surface to the raised surface.

10. The cutting insert according to claim 9, wherein the upper surface further comprises a second surface being a continuously inclined surface that becomes continuously further away from the lower surface as the second surface extending from the second bottom surface to the raised surface to directly connect the second bottom surface to the raised surface.

* * * * *